United States Patent
Kim

(10) Patent No.: US 10,860,699 B2
(45) Date of Patent: Dec. 8, 2020

(54) TERMINAL DEVICE AND METHOD FOR PERFORMING USER AUTHENTICATION BY MEANS OF BIOMETRIC DATA

(71) Applicant: LG ELECTRONICS INC., Seoul (KR)

(72) Inventor: Sangwon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 197 days.

(21) Appl. No.: 15/756,889

(22) PCT Filed: Sep. 3, 2015

(86) PCT No.: PCT/KR2015/009316
§ 371 (c)(1),
(2) Date: Mar. 1, 2018

(87) PCT Pub. No.: WO2017/039036
PCT Pub. Date: Mar. 9, 2017

(65) Prior Publication Data
US 2018/0276356 A1    Sep. 27, 2018

(51) Int. Cl.
*G06F 7/04* (2006.01)
*G06F 12/00* (2006.01)
*G06F 12/14* (2006.01)
*G06F 13/00* (2006.01)
*G11C 7/00* (2006.01)
*G06F 21/32* (2013.01)
*G06F 21/31* (2013.01)

(52) U.S. Cl.
CPC .............. *G06F 21/32* (2013.01); *G06F 21/31* (2013.01)

(58) Field of Classification Search
USPC ......................................................... 726/18
See application file for complete search history.

(56) References Cited

U.S. PATENT DOCUMENTS

| | | | | |
|---|---|---|---|---|
| 2007/0041620 A1* | 2/2007 | Ito | ............................ | G06K 9/00 382/115 |
| 2010/0148922 A1* | 6/2010 | Yamada | .................. | G06F 21/32 340/5.82 |
| 2015/0371073 A1* | 12/2015 | Cho | ..................... | G06F 3/04886 382/124 |

FOREIGN PATENT DOCUMENTS

| | | |
|---|---|---|
| JP | 2012059084 | 3/2012 |
| KR | 101115405 | 2/2012 |
| KR | 1020140054172 | 5/2014 |
| KR | 101514706 | 4/2015 |
| KR | 1020150063896 | 6/2015 |

OTHER PUBLICATIONS

PCT International Application No. PCT/KR2015/009316, International Search Report dated May 24, 2016, 4 pages.

* cited by examiner

*Primary Examiner* — Wasika Nipa
*Assistant Examiner* — Samuel Ambaye
(74) *Attorney, Agent, or Firm* — Lee Hong Degerman Kang & Waimey

(57) ABSTRACT

The present invention provides an authentication which is performed by means of simultaneously inputting biometric data such as fingerprint, iris and the like when inputting an authentication number, wherein input area provided to a user varies such that biometric data can be input and recognized accurately and easily. Therefore, the present invention enhances convenience for a user and increases security and reliability of authentication.

12 Claims, 16 Drawing Sheets

TERMINAL DEVICE AND METHOD FOR PERFORMING USER AUTHENTICATION BY MEANS OF BIOMETRIC DATA

CROSS-REFERENCE TO RELATED APPLICATIONS

This application is the National Stage filing under 35 U.S.C. 371 of International Application No. PCT/KR2015/009316, filed on Sep. 3, 2015, the contents of which are hereby incorporated by reference herein in its entirety.

TECHNICAL FIELD

The present invention relates to a terminal device and method for performing user authentication using biometric data and, more particularly, to a terminal device and method for performing user authentication using biometric data, which can simultaneously input biometric data such as a fingerprint and an iris upon inputting an authentication number to perform authentication and can provide an authentication method capable of increasing user convenience and security and reliability of authentication by changing and providing an input region to a user in order to accurately and easily input and recognize the biometric data.

BACKGROUND ART

Biometrics is technology of recognizing unique body information of an individual, such as a fingerprint, an iris, a blood vessel and voice. Since biometric data used in biometrics is unique and is information on a body of an individual, there is no fear of forgetting or exposing biometric data to a third party. Since a user needs to be physically on the spot when performing authentication, biometric data is little likely to be forged or robbed, thereby providing reliability and security. Due to such advantages, the number of fields, to which biometrics is applied, has been gradually increased. As a field, to which biometrics is applied, there is biometric payment.

FIG. 1 is a diagram showing an existing authentication window for performing user authentication.

The authentication window 100 shown in FIG. 1 may include a keypad region 110 and an authentication number display region 120.

The keypad region 110 includes a plurality of numeral keys 111, a backspace key 113 for correcting an input number, and an Enter key for completing input of an authentication number. The keypad region 110 may sense user contact or pressure applied by a user, thereby recognizing an authentication number input by the user.

The authentication number display region 120 displays the authentication number input by the user. In this case, the user determines whether the authentication number is accurately input by referring to content displayed in the authentication number display region 120 and corrects the input content using the backspace key 113 or completes input using the Enter key 112. Meanwhile, in order to strengthen security, the authentication number display region 120 may display symbols or special letters instead of the authentication number input by the user.

In the existing user authentication, the authentication number is used to authenticate the user. Further, in order to strengthen a security algorithm, the number of digits of the authentication number may be increased or a mixer of numbers, letters or special symbols may be used.

However, as the number of digits of the authentication number input by the user is increased or the authentication number becomes complicated, security may be strengthened, but the user should individually remember complicated authentication numbers, thereby increasing user inconvenience. Accordingly, there is a need for a new authentication method capable of increasing security and reliability while decreasing user inconvenience.

DISCLOSURE

Technical Problem

An object of the present invention is to provide a terminal device and method for performing user authentication using biometric data, which can simultaneously input biometric data such as a fingerprint and an iris upon inputting an authentication number to perform authentication and can provide an authentication method capable of increasing user convenience and security and reliability of authentication by changing and providing an input region to a user in order to accurately and easily input and recognize the biometric data.

The technical problems solved by the present invention are not limited to the above technical problems and other technical problems which are not described herein will become apparent to those skilled in the art from the following description.

Technical Solution

In accordance with one embodiment, a terminal device for performing user authentication using biometric data includes a display unit for displaying a plurality of input regions in which authentication information including the biometric data is input, an authentication information recognizer overlapping the plurality of input regions to recognize the authentication information, and a controller for changing a first input region for inputting the biometric data among the plurality of input regions in correspondence with a type of the biometric data to display the changed first input region on the display unit and controlling the authentication information recognizer to recognize the authentication information input in the plurality of input regions including the first input region.

In accordance with another embodiment, a method of performing user authentication using biometric data includes displaying a plurality of input regions in which authentication information including the biometric data is input, changing a first input region for inputting the biometric data among the plurality of input regions in correspondence with a type of the biometric data and displaying the changed first input region on the display unit, and recognizing the authentication information input in the plurality of input regions including the first input region.

Advantageous Effect

According to the embodiments of the present invention, it is possible to provide an authentication method capable of increasing security and reliability of authentication by simultaneously inputting biometric data such as a fingerprint and an iris upon inputting an authentication number to perform authentication.

Further, it is possible to increase user convenience and recognition accuracy by changing and providing an input region to a user in order to accurately and easily input and recognize biometric data.

BEST MODE

Hereinafter, the embodiments of the present invention will be described in detail with reference to the drawings. However, the scope of the present invention is not limited by the embodiments described below, and other embodiments may be easily proposed by addition, change and deletion of components within the scope of the present invention.

Although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within. In the following description, the term "including" does not exclude presence of other components or steps.

Figure 1:
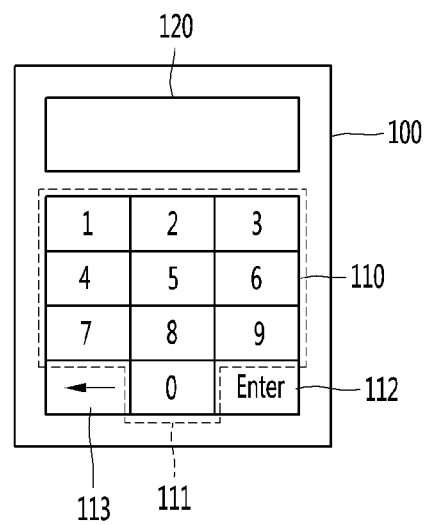
FIG. 1 is a diagram showing an existing authentication window for performing user authentication.
Figure 2:
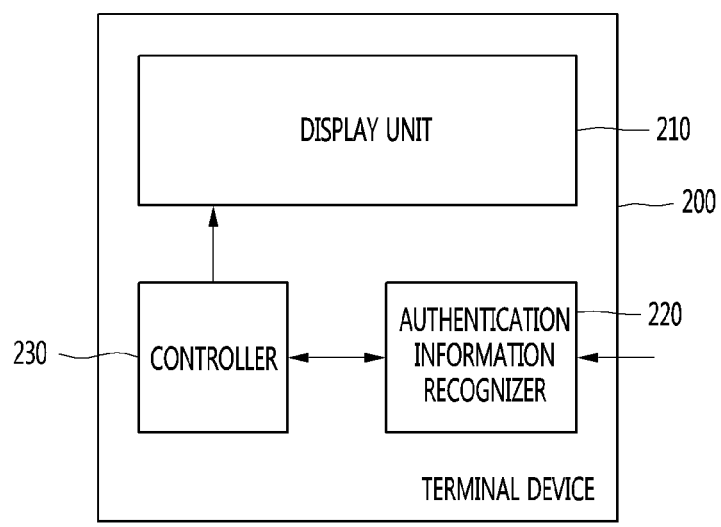
FIG. 2 is a diagram showing the configuration of a terminal device for performing user authentication using biometric data according to an embodiment of the present invention.

FIG. 2 is a diagram showing the configuration of a terminal device for performing user authentication using biometric data according to an embodiment of the present invention.

The terminal device 200 for performing user authentication using biometric data according to the embodiment of the present invention may be a mobile terminal such as a smartphone or a cellular phone, a computer such as a laptop, a portable communication device, a headset, a portable computing device such as a personal assistance device, an entertainment device (e.g., a music or video device or a satellite radio), a game device or system, a global positioning system device or an arbitrary device configured to perform communication through a wireless medium.

In addition, the terminal device 200 for performing user authentication using biometric data according to the embodiment of the present invention may be a wearable device including glasses, a wristwatch or a band type device, which is used through wireless communication with a smartphone or a tablet.

The terminal device 200 for performing user authentication using biometric data according to the embodiment of the present invention may include a display unit 210, an authentication information recognizer 220 and a controller 230.

The display unit 210 displays a plurality of input regions in which authentication information including biometric data is input.

The authentication information is user authentication information used to determine whether a user has access rights and may include at least one of biometric data and an authentication number.

The biometric data may be information on at least one of an iris, a blood vessel, a fingerprint, a face and voice. The information will be described in detail with reference to FIG. 5.

The authentication number is a combination of at least one of numbers, letters and special symbols input for authentication. In the present invention, the authentication number has the same meaning as a password. Accordingly, hereinafter, the authentication number and the password are used interchangeably.

The plurality of input regions is a user interface (UI) for enabling the user to input authentication information and is displayed on the display unit 210. The plurality of input regions may include an authentication number input region for inputting an authentication number and a biometric data input region for inputting biometric data. The input regions may be configured in different forms.

In this case, the user may input authentication information in the plurality of input regions. Specifically, if the authentication information is a combination of biometric data and an authentication number, the user may input the biometric data in the biometric data input region and input the authentication number in the authentication number input region, thereby performing user authentication.

Meanwhile, the biometric data input region and authentication number input region may not be divided. In this case, the user may input the authentication number and the biometric data in the same input region, thereby performing user authentication.

To this end, the display unit 210 may include a display panel (not shown) implemented in the form of a Liquid Crystal Display (LCD), an Organic Light Emitting Diode (OLED) or a Plasma Display Panel (PDP) and a panel drive unit (not shown) for driving the display panel.

The authentication information recognizer 220 overlaps the plurality of input regions to recognize the authentication information. To this end, the authentication information recognizer 220 may be located at a lower layer of a layer in which the plurality of input regions is located.

According to one embodiment, the authentication information recognizer 220 includes an authentication number recognition layer for recognizing an authentication number and a biometric data recognition layer for recognizing biometric data, and the authentication number recognition layer and the biometric data recognition layer overlap each other. This will be described below with reference to FIG. 4.

According to another embodiment, the authentication information recognizer 220 includes a plurality of biometric data recognition layers for recognizing a plurality of pieces of biometric data, and the plurality of biometric data recognition layers overlap each other.

The controller 230 displays the plurality of input regions on the display unit 210 and controls the authentication information recognizer 220 to recognize the authentication information input in the plurality of input regions.

According to one embodiment, the controller 230 may change and display the biometric data input region of the plurality of input regions in correspondence with the type of the biometric data on the display unit 210, and control the authentication information recognizer 220 to recognize the authentication information input in the plurality of input regions including the biometric data input region.

In this case, the shape, size, location and input method of the biometric data input region may be changed according to the type of the biometric data. For example, for convenience of input, a vertically enlarged biometric data input region may be displayed in case of fingerprint recognition and a horizontally enlarged biometric data input region may be displayed in case of iris recognition. In addition, in case of fingerprint recognition, the biometric data input region may be displayed in a keypad part for inputting the authentication number, such that the user may perform authentication number input and fingerprint input at the same location.

Specifically, if input of biometric data is requested, the controller 230 may increase the size of the biometric data input region and display the biometric data input region on the display unit 210.

The biometric data is different from the authentication number in terms of properties. That is, the authentication number including letters or numbers may be recognized when user input is performed in a corresponding point region, but biometric data such as a fingerprint pattern or an iris muscle pattern may be recognized only when the whole pattern is input. Accordingly, if input of biometric data such as a fingerprint, an iris or a blood vessel is requested, by increasing the size of the biometric data input region, it is possible to provide convenience of input and to increase recognition accuracy.

According to another embodiment, the controller 230 may perform user authentication based on the authentication information including the biometric data and the authentication number, and configure the authentication information such that the same authentication number is set with respect to a plurality of users belonging to a specified group.

According to another embodiment, the controller 230 may configure authentication information, such that an authentication number value of a specific digit place of the authentication number and biometric data corresponding to the specific digit place are combined and input.

According to another embodiment, the controller 230 may configure authentication information, such that authentication number values of a plurality of specific digit places of the authentication number and biometric data corresponding to the digit places are combined and input. In this case, the controller 230 may configure the authentication information such that the authentication order of the plurality of specific digit places is arbitrarily set.

Figure 3:
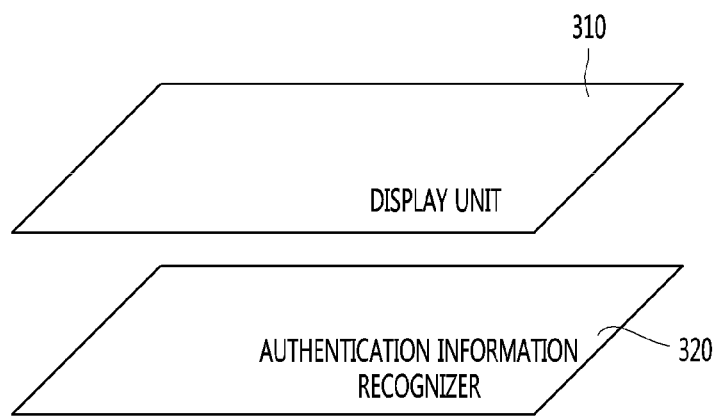
FIG. 3 is a diagram showing the configuration of a display unit and an authentication information recognizer disposed in a terminal device according to an embodiment of the present invention.

FIG. 3 is a diagram showing the configuration of a display unit and an authentication information recognizer disposed in a terminal device according to an embodiment of the present invention.

A display unit 310 is located at a high layer. The display unit 310 displays a plurality of input regions, which is an UI for receiving authentication information from a user.

An authentication information recognizer 320 for recognizing authentication information is located at a low layer. In this case, the authentication information recognizer 320 overlaps a plurality of input regions to recognize an authentication number or biometric data input the plurality of input regions.

Figure 4:
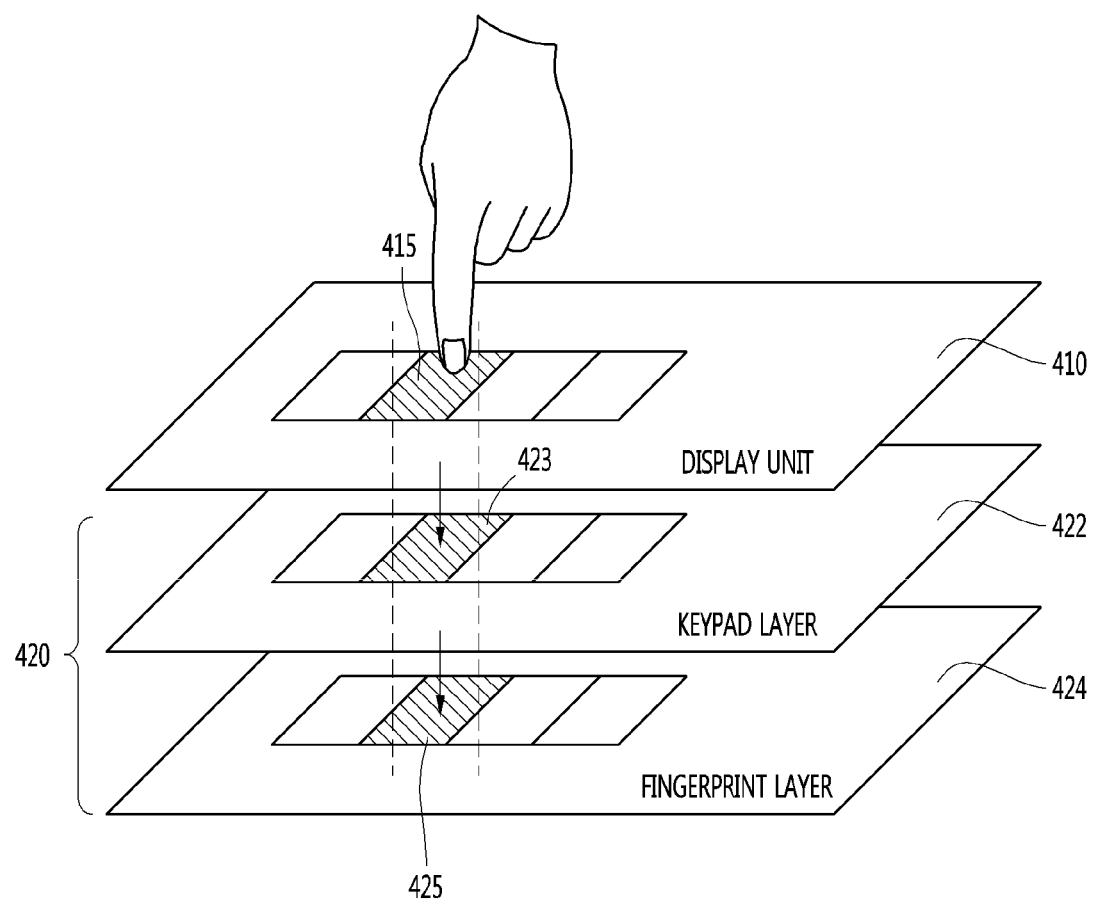
FIG. 4 is a diagram showing the configuration of a display unit and an authentication information recognizer disposed in a terminal device according to an embodiment of the present invention.

FIG. 4 is a diagram showing the configuration of a display unit and an authentication information recognizer disposed in a terminal device according to an embodiment of the present invention.

As described above with reference to FIG. 2, the authentication information may include at least one of biometric data and an authentication number. In this case, an authentication information recognizer 420 may include an authentication number recognition layer for recognizing an authentication number and a biometric data recognition layer for recognizing biometric data, in order to recognize the authentication information.

For example, if the authentication information includes a fingerprint and an authentication number, as shown in FIG. 4, the authentication information recognizer 420 includes a fingerprint layer 424 for recognizing a fingerprint and a keypad layer 422 for recognizing an authentication number. Here, the fingerprint layer 424 corresponds to the biometric data recognition layer, and the keypad layer 422 corresponds to the authentication number recognition layer.

Referring to FIG. 4 again, a display unit 410 is located at a highest layer, the keypad layer 422 is located at a middle layer, and the fingerprint layer 424 is located at a lowest layer.

In this case, the display unit 410, the keypad layer 422 and the fingerprint layer 424 overlap one another. That is, the regions of the display unit 410, the keypad layer 422 and the fingerprint layer 424 are aligned. Therefore, a specific part 415 displayed on the display unit 410 may be touched, thereby simultaneously inputting a number and a fingerprint.

When a user touches the specific part 415 on the display unit 410, the number 423 corresponding to the specific part 415 on the keypad layer 422 and the fingerprint 425 input through the specific part 415 on the fingerprint layer 424 are simultaneously or sequentially recognized. Therefore, the user may simultaneously input the authentication number such as a number and biometric data such as a fingerprint or an iris, upon user input.

Therefore, in order to input authentication number and biometric data, since a number and a fingerprint can be simultaneously input through one input on one screen or in one step without performing steps implemented on different screens, it is possible to increase user convenience.

Further, even when the user individually inputs an authentication number and biometric data due to properties of the authentication number and the biometric data, since the locations of the authentication number recognition layer and the biometric data recognition layer are aligned, input can be performed in the same input region, thereby minimizing user inconvenience.

If the authentication information includes a plurality of pieces of biometric data, the authentication information recognizer 420 may include the plurality of biometric data recognition layers configured to overlap one another. Since the structure, in which the display unit 410 and the authentication information recognizer 420 are disposed, is similar to that of FIG. 4 and thus will be omitted in the figure.

Figure 5:
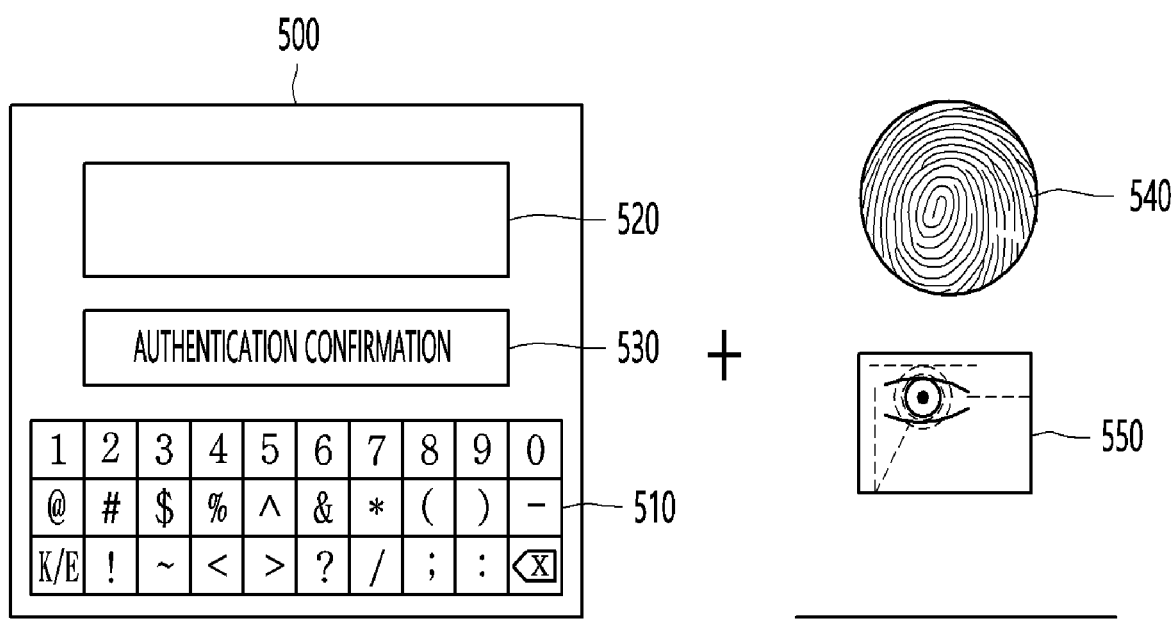
FIG. 5 is a schematic diagram illustrating a method of performing user authentication using biometric data according to an embodiment of the present invention.

FIG. 5 is a schematic diagram illustrating a method of performing user authentication using biometric data according to an embodiment of the present invention.

According to the present invention, authentication information may be configured such that biometric data and an authentication number are combined and input in the same input step, and user authentication may be performed based on the authentication information.

As shown in FIG. 5, an authentication window for inputting the authentication information may include a keypad part 510 including letters, numbers and special symbols, a display part 520, in which an input authentication number is displayed, and an authentication confirmation part 530 for completing input of the authentication information.

Input of the authentication number may be performed through the keypad part 510 and the authentication confirmation part 530. In this case, for accurate input, a user may refer to the input authentication number displayed in the display part 520.

Input of the biometric data may be performed through the keypad part 510 or the display part 520.

If input of the biometric data is performed through the keypad part 510, for example, the user may long touch Number 3 of the keypad part 510 or touch Number 3 twice, thereby simultaneously or sequentially inputting Number 3 and a fingerprint. In order to recognize the fingerprint, Number 3 is long touched. In order to input the fingerprint after inputting a number, Number 3 is touched twice.

If input of the biometric data is not performed through the keypad part 510 but is performed through the display part 520, for example, the user may touch Number 3 of the keypad part 510, input the fingerprint in the display part 520 and select the authentication confirmation part 530, thereby completing input of the authentication information.

In this case, the biometric data may be for fingerprint recognition 540, iris recognition 550, blood vessel recognition (not shown), face recognition (not shown) and voice recognition (not shown).

In fingerprint recognition 540, about 40 identifiable features such as separated points, connected points, end points, etc. are recognized through an infrared sensor. This is the most frequently used biometric method.

In iris recognition 550, a comb-shaped muscle pattern for controlling pupil dilation is scanned and extracted through an infrared camera. Since about 260 features are present, stability is high.

In voice recognition (not shown), various voice features are extracted and analyzed according to voice pitch, a way of speaking, and shapes of a nasal cavity and an oral cavity.

In face recognition (not shown), features such as the contour of a face, distances between and locations of eyes, a nose and a mouth, the height of a cheekbone and a nose, etc. may be detected and compared with an existing database, thereby performing authentication.

Blood vessel recognition (not shown) is authentication technology of using a unique shape of the blood vessel, in which the trace of a blood vessel is confirmed through infrared rays.

However, the biometric data is not limited thereto, and biometric data having 1) a universal feature, 2) a unique feature, 3) a permanent feature, 4) and a collectable feature capable of being acquired by a sensor may be used as the biometric data of the present invention.

In the present invention, for convenience of description, assume that fingerprint recognition 540 and iris recognition 550 are used as biometric data.

Hereinafter, various embodiments of the present invention capable of increasing authentication reliability and security and providing user convenience using biometric data will be described in detail.

Figure 6:
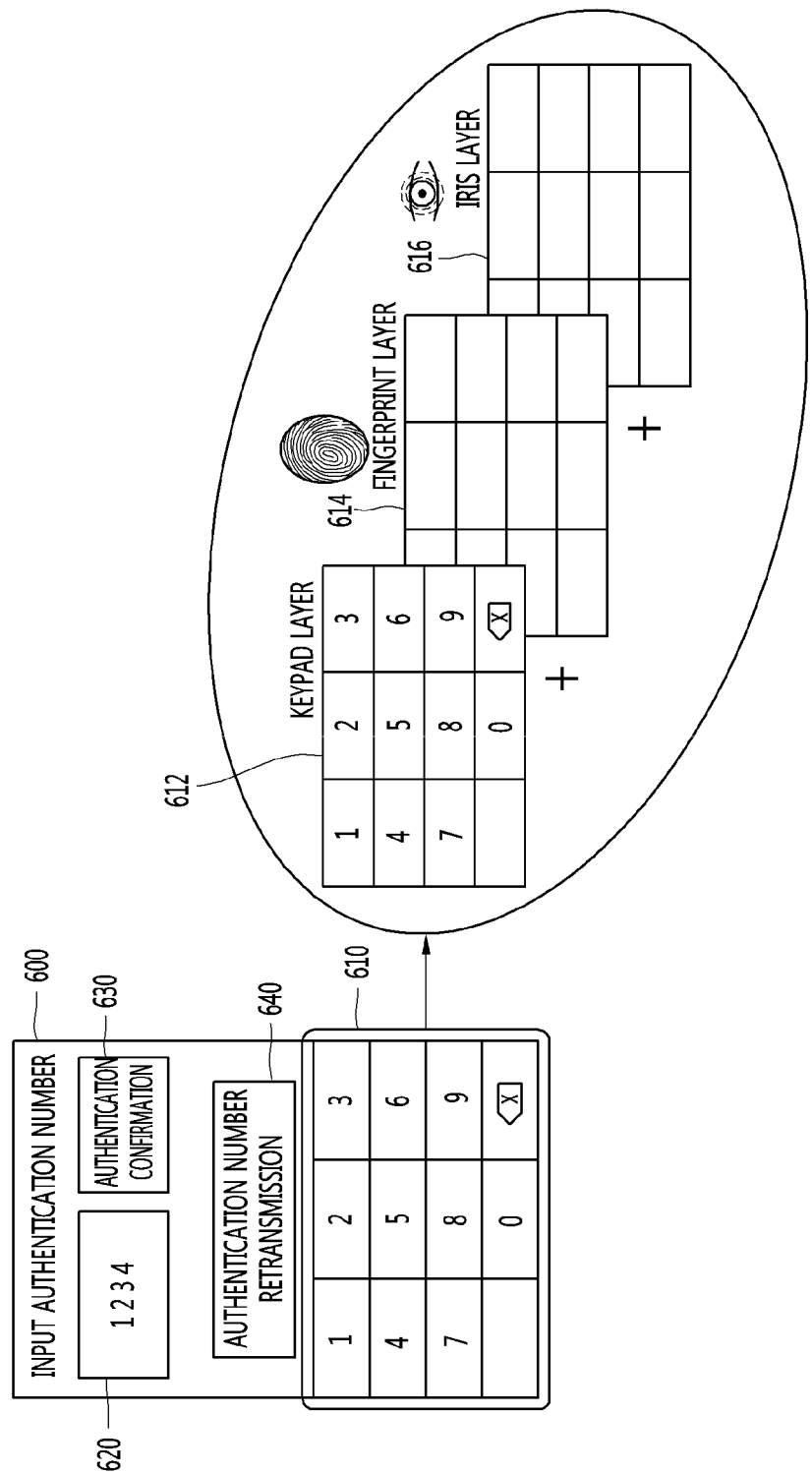
FIG. 6 is a schematic diagram illustrating a method of performing user authentication using biometric data according to an embodiment of the present invention.

FIG. 6 is a schematic diagram illustrating a method of performing user authentication using biometric data according to an embodiment of the present invention.

According to the present invention, authentication information may be configured by combining an authentication number and a plurality of pieces of biometric data, an authentication number recognition layer and a plurality of biometric data recognition layers may be disposed to overlap each other such that the authentication information is input in the same region.

An authentication window 600 for inputting authentication information may include a keypad part 610, a display part 620, an authentication confirmation part 630, an authentication number retransmission part 640.

In this case, as shown in FIG. 6, a keypad layer 612, a fingerprint layer 614 and an iris layer 616 are sequentially located at lower layers of the keypad part 610 to overlap one another.

Figure 7:
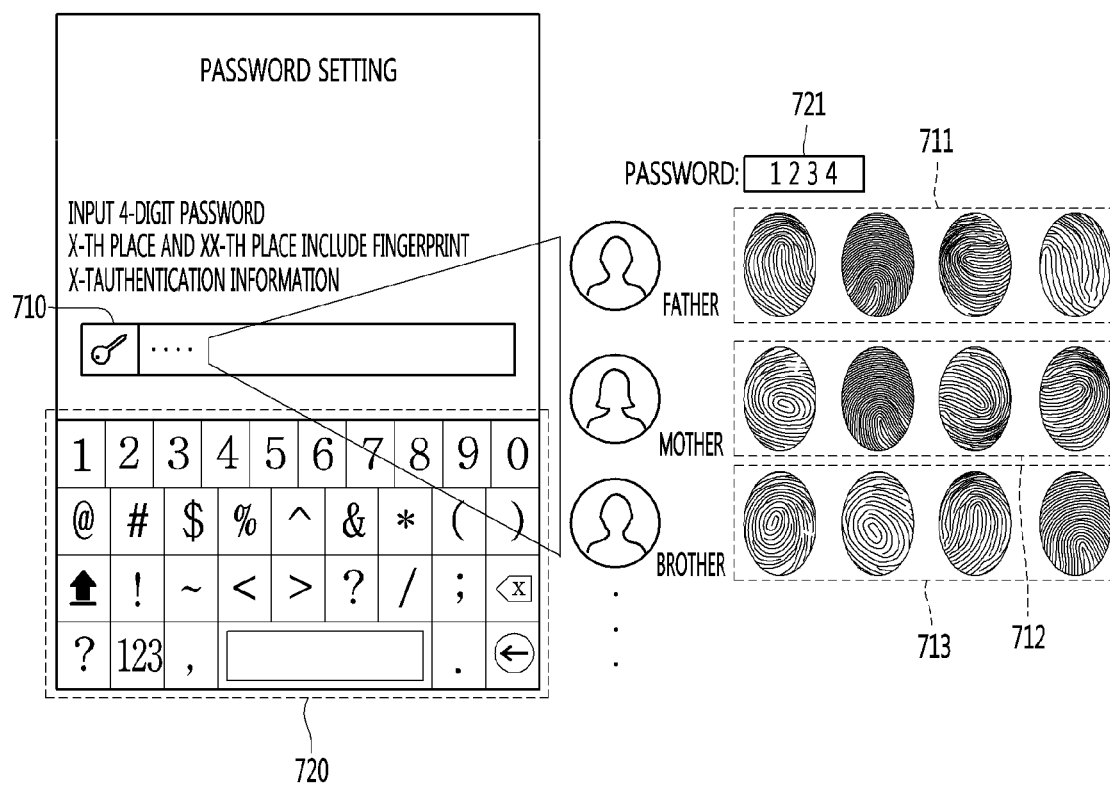
FIG. 7 is a schematic diagram illustrating a method of performing user authentication using biometric data according to an embodiment of the present invention.

FIG. 7 is a schematic diagram illustrating a method of performing user authentication using biometric data according to an embodiment of the present invention.

An authentication number, that is, a password, may be shared and used. For example, one password may be set and shared as a password forgettable by family members or executives and staff members. In this case, since security strength may become weak, the fingerprints of group members are registered in addition to the same password to perform authentication, thereby increasing security strength.

To this end, in the present embodiment, authentication information may be configured such that the same authentication number is set with respect to a plurality of users belonging to a specific group.

As shown in FIG. 7, when a window for setting authentication information is displayed, each group member inputs an authentication number through the keypad part 720 and registers fingerprint information thereof in the display part 710. For example, a father, a mother and a brother, which are family members, register the same password "1234" 721 and register unique fingerprints 711, 712 and 713 thereof. In this case, the authentication information may be configured by combining the password "1234" 721 and the fingerprint.

If the authentication information is configured, the fingerprints of different fingers may be respectively registered in the digit places of the password or a plurality of fingerprints may be registered to perform authentication through any one of the plurality of fingerprints.

For example, in FIG. 7, if it is assumed that the fingerprints of four fingers of the brother are registered in correspondence with the digit places of the password, authentication is successfully performed by inputting numbers and fingerprints with respect to all digital places using a method of inputting Number 2 and a fingerprint corresponding to Number 2. However, if a plurality of fingerprints of the brother is registered and authentication is performed using any one of the plurality of fingerprints, when the brother inputs Number 2 and inputs any one of the fingerprints 713 thereof, authentication is successfully performed.

Meanwhile, even when the group members share and use the password, since authentication is performed using the same password and the unique fingerprint of each member, it is possible to increase security and reliability of user authentication.

Figure 8:
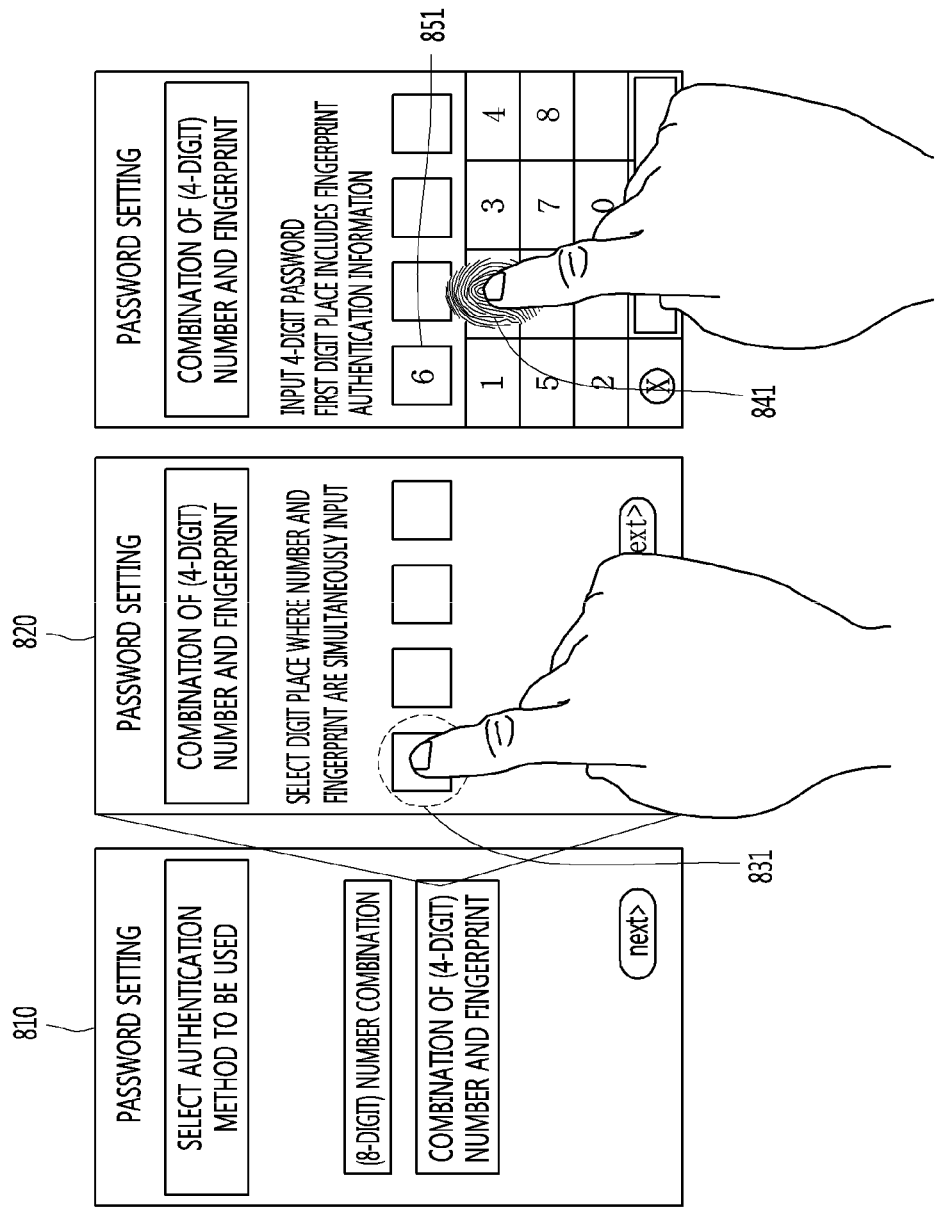
FIG. 8 is a schematic diagram illustrating a method of performing user authentication using biometric data according to an embodiment of the present invention.

FIG. 8 is a schematic diagram illustrating a method of performing user authentication using biometric data according to an embodiment of the present invention.

According to the method of performing user authentication using biometric data according to the embodiment of the present invention, authentication information may be configured such that the authentication number value of a specific digit place of an authentication number and biometric data corresponding to the specific digit place are combined and input.

Referring to FIG. 8, a process of combining a password value and a fingerprint to be used by a user for authentication with respect to a specific digit place of a password is shown.

As shown in FIG. 8, when an authentication information setting window 810 is displayed, the user selects a "combination of a (4-digit) number and a fingerprint" and moves to a screen 820 for selecting a specific digit place of the password.

The user simultaneously inputs a number and a fingerprint to select a digit place to be authenticated. In FIG. 8, the user simultaneously inputted the password and the fingerprint of the first digit place 831 of the password.

Thereafter, the user sequentially inputs the password values and inputs both the password value and the fingerprint with respect to the first digit place. For example, if it is assumed that the password value of the first digit place is 6 in FIG. 8, the user touches a key 841 marked with "6" and inputs fingerprint information through the key 841. When fingerprint authentication is completed and "6" is displayed at the first digit place 851, the user inputs the remaining authentication number value, thereby completing the authentication information registration process.

Referring to FIG. 8, the authentication number value and the fingerprint are both input through the key 841 marked with "6". However, in the case of the fingerprint, since the fingerprint pattern of a finger needs to be input, a space required to input the fingerprint is large and wide unlike the authentication number value. Accordingly, when the fingerprint information is input through the key 841 marked with "6", since only part of the pattern necessary for recognition is input, recognition may fail or the user may not easily input the finger information.

Figure 9:
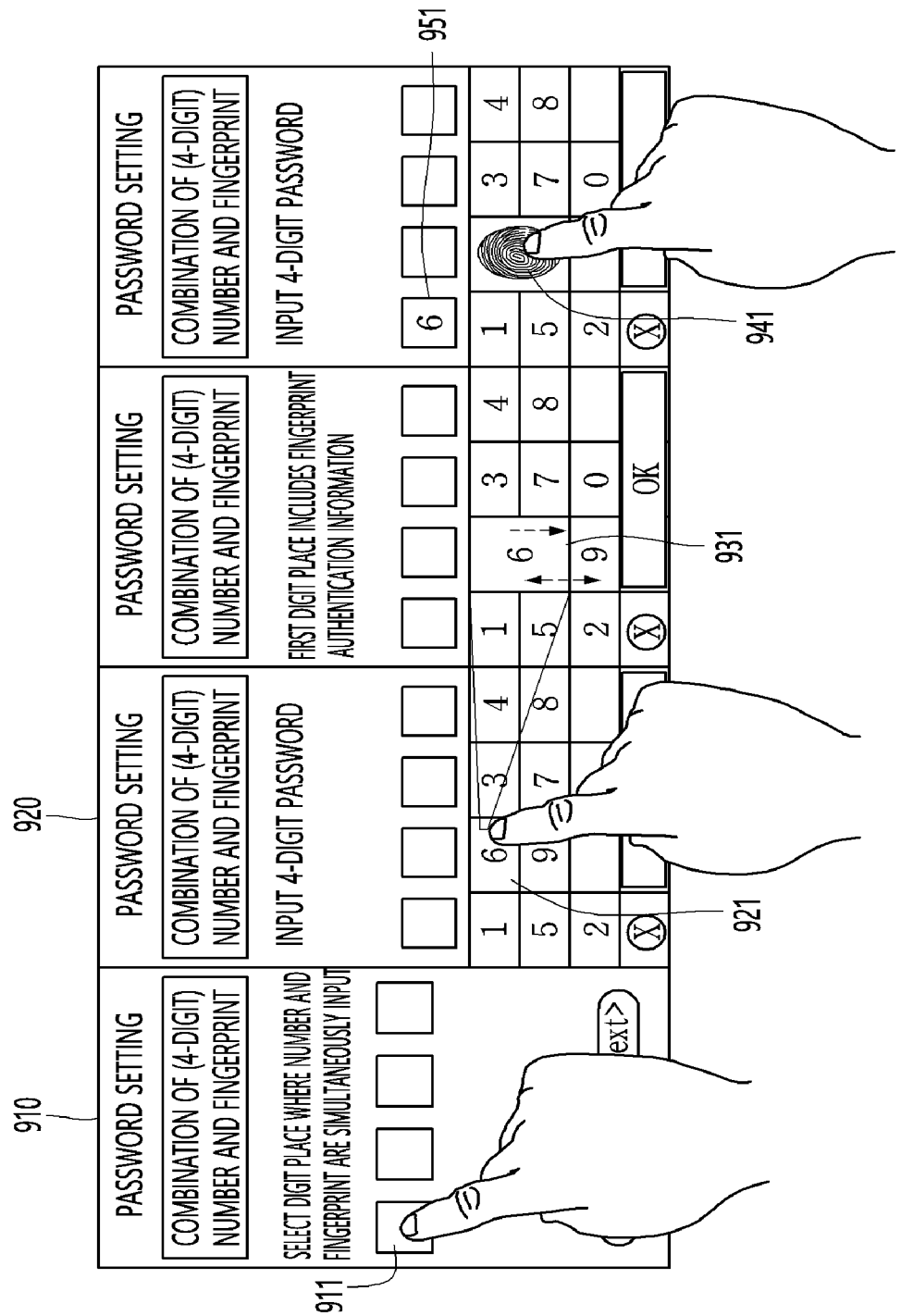
FIG. 9 is a schematic diagram illustrating a method of performing user authentication using biometric data according to an embodiment of the present invention.

FIG. 9 is a schematic diagram illustrating a method of performing user authentication using biometric data according to an embodiment of the present invention.

An authentication number and biometric data configuring authentication information are different in a space required for input due to properties thereof. For example, letters, numbers and special symbols configuring the authentication number may be input even when only parts of the keys allocated thereto are touched. However, in the case of biometric data such as a fingerprint or an iris, since the form of the fingerprint or a muscle pattern of the iris needs to be recognized, a space required to input the fingerprint or the iris is relatively large and wide.

Accordingly, in the present embodiment, the biometric data input region is changed and displayed in correspondence with the type of the biometric data. Specifically, if input of the biometric data is requested, the biometric data input region may be enlarged and displayed.

In addition, the form, size, location and input method of the biometric data input region may be changed according to the type of the biometric data. For example, in consideration of the properties of the input biometric data, if input of the fingerprint is requested, the biometric data input region may be enlarged in a vertical direction and, when input of the iris is requested, the biometric data input region may be enlarged in a horizontal direction.

By changing the biometric data input region according to the properties of the biometric data, the user can more easily input the biometric data and the input biometric data may be more accurately recognized.

In FIG. 9, assume that user authentication is performed based on the authentication information registered in FIG. 8, that is, the authentication information registered such that the password value of 6 and the fingerprint are both input with respect to the first digit place of the password.

Referring to FIG. 9, the user selects a digit place where a number and a fingerprint will be simultaneously input, that is, a first digit place 911, in an authentication window 910.

Upon switching to an authentication window 920 in which a keypad is displayed, the user inputs both the password value and the fingerprint with respect to the first digit place. Specifically, when the user touches a key 921 marked with "6" corresponding to the first digit place, the key 931 marked with "6" is enlarged such that the fingerprint is input.

In this case, the user inputs the fingerprint 941 through the enlarged key 931 marked with "6". When the input fingerprint is equal to the registered fingerprint, the input password value "6" 951 is displayed. Thereafter, the user sequentially inputs the password values of the remaining digit places, thereby completing the authentication information input process.

Therefore, the user may more easily input the fingerprint pattern of the finger or the muscle pattern of the iris and the terminal device 200 may more accurately perform recognition based on the accurate biometric data.

Figure 10:
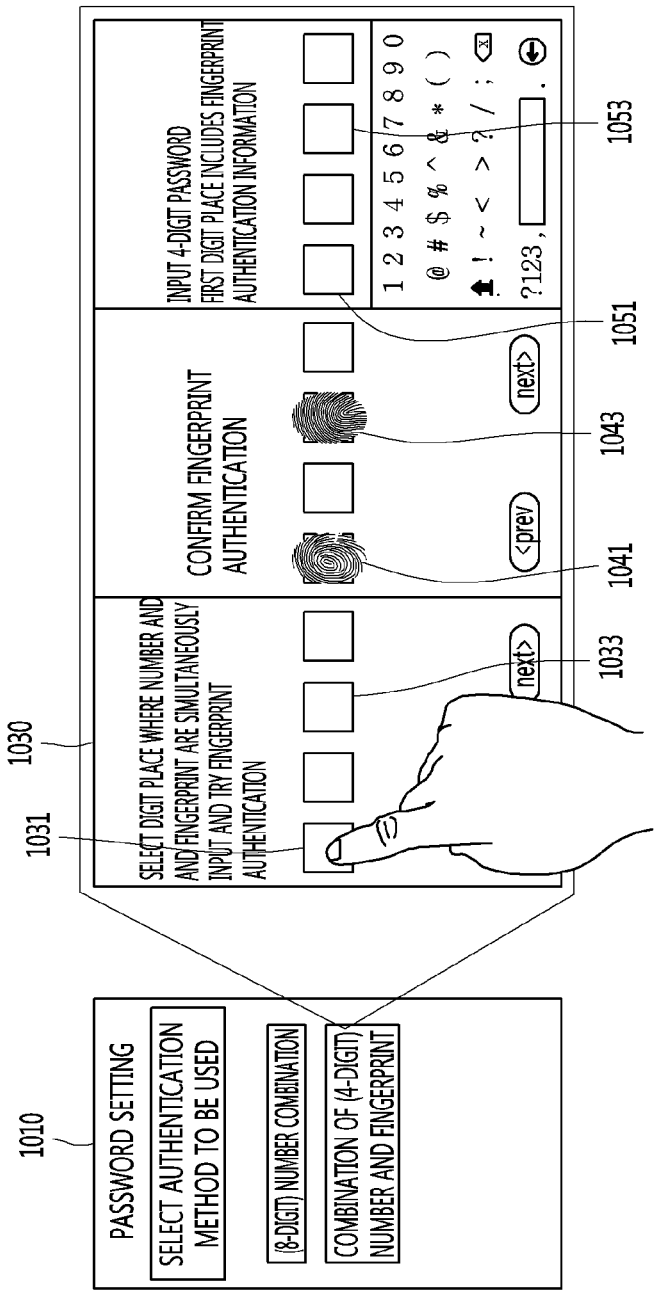
FIG. 10 is a schematic diagram illustrating a method of performing user authentication using biometric data according to an embodiment of the present invention.

FIG. 10 is a schematic diagram illustrating a method of performing user authentication using biometric data according to an embodiment of the present invention.

According to the method of performing user authentication using biometric data according to the embodiment of the present invention, authentication information may be configured such that the authentication number values of a plurality of specific digit places of an authentication number and biometric data corresponding to the specific digit places are combined and input.

As shown in FIG. 10, when an authentication window 1010 is displayed, the user who performs user authentication selects a "combination of a (4-digit) number and a fingerprint" based on the authentication information including the combination of the password and the fingerprint. In this case, the screen is switched to an authentication window 1030 in which numbers and fingerprints are simultaneously input.

The user selects digit places where numbers and fingerprints are simultaneously input, that is, a first digit place 1031 and a third digit place 1033, in the authentication window 1030 and inputs the fingerprints.

In this case, when the fingerprints are authenticated with respect to the digit places, the input fingerprints are displayed in the first digit place 1041 and the third digit place 1043.

Thereafter, a keypad used to input the password is displayed. The user sequentially inputs the password values and inputs the password values and the fingerprints with respect to a first digit place 1051 and a third digit place 1053. Of course, the user needs to input the password values with respect to the remaining digit places. When the password values are sequentially input, the authentication information input process is completed.

Meanwhile, although it is assumed that authentication of the first digit place and the third digit place is sequentially performed from a high digit place to a low digit place in FIG. 10, the authentication order of the first digit place and the third digit place may be arbitrarily set. This will be described below with reference to FIG. 12.

Further, authentication may be performed using the same fingerprint or different fingerprints as the fingerprint information of the plurality of specific digit places.

Figure 11:
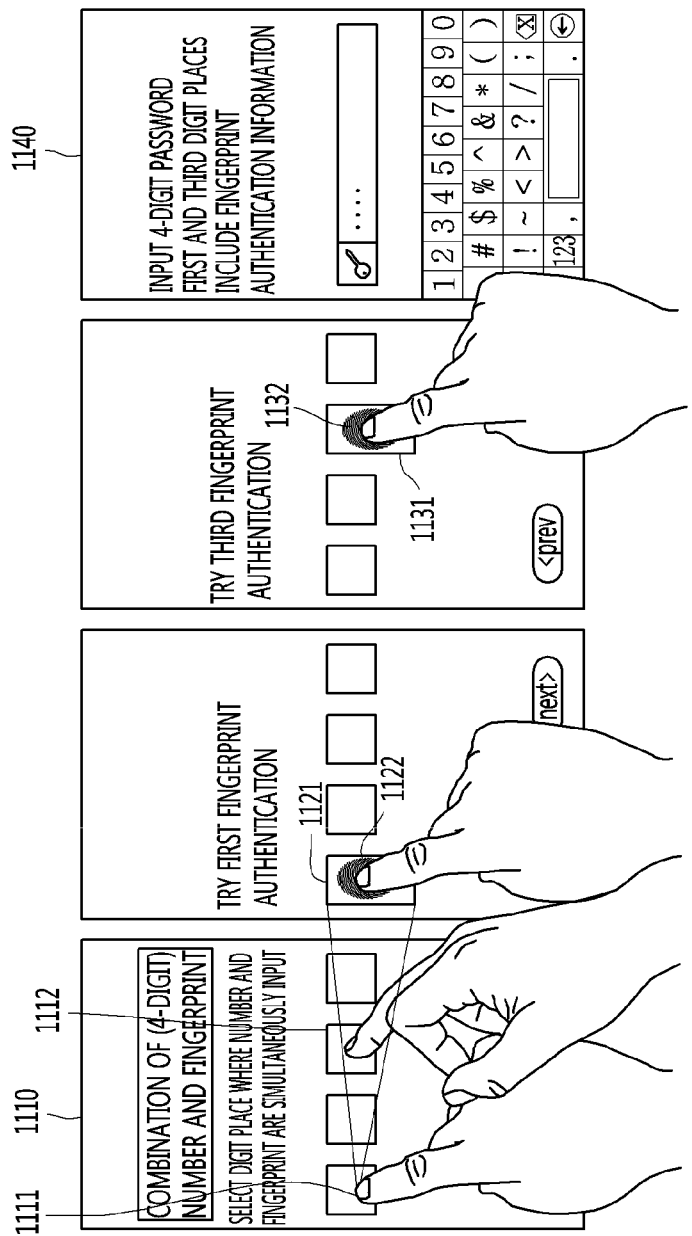
FIG. 11 is a schematic diagram illustrating a method of performing user authentication using biometric data according to an embodiment of the present invention.

FIG. 11 is a schematic diagram illustrating a method of performing user authentication using biometric data according to an embodiment of the present invention.

In the present embodiment, authentication information is configured such that authentication number values of a plurality of specific digit places of an authentication number and biometric data corresponding to the digit places are combined and input, and input regions corresponding to the digit places where fingerprint input is requested may be changed and displayed.

Referring to FIG. 11, the user selected a first digit place 1111 and a third digit place 1112 as digit places of the password, in which numbers and fingerprints are both input, in an authentication window 1110.

When the input region 1121 of the first digit place enlarged in the vertical direction for fingerprint input is displayed, the user inputs a fingerprint 1122.

Thereafter, fingerprint input of the third digit place is also equally performed. When the input region 1131 of the third digit place enlarged in the vertical direction for fingerprint input is displayed, the user inputs a fingerprint 1132.

When fingerprint authentication of the two digit places are completed, switching to an authentication window 1140 in which the keypad used to input the four-digit password is displayed is performed.

Meanwhile, although it is assumed that the first digit place and the third digit place are sequentially authenticated in descending order, the order of digit places to be authenticated may be arbitrarily set.

Figure 12:
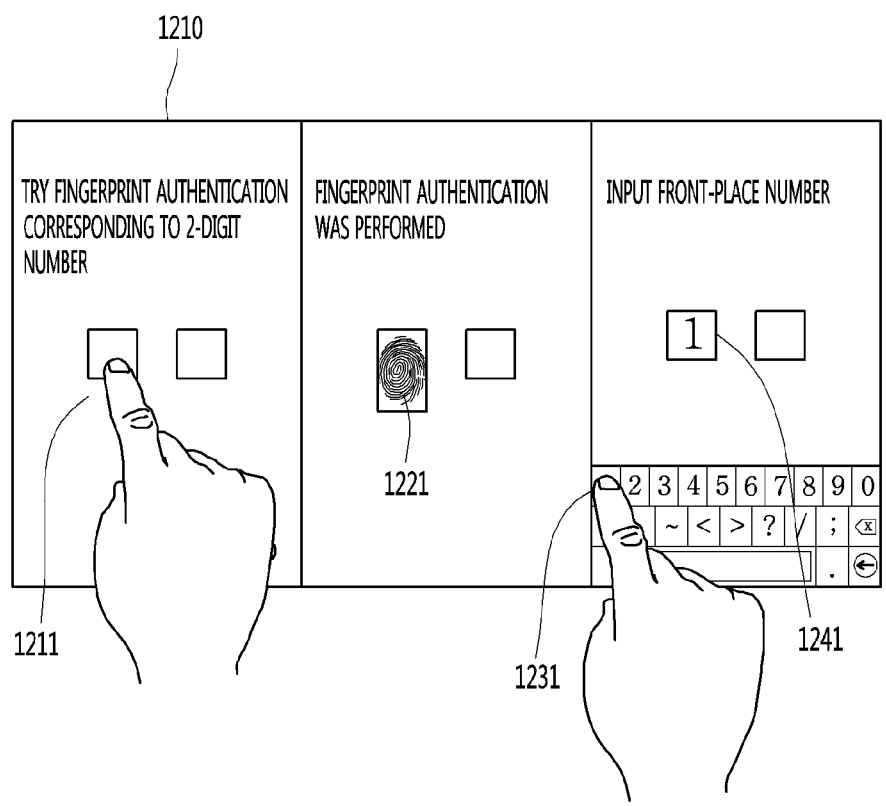
FIG. 12 is a schematic diagram illustrating a method of performing user authentication using biometric data according to an embodiment of the present invention.

FIG. 12 is a schematic diagram illustrating a method of performing user authentication using biometric data according to an embodiment of the present invention.

In the present embodiment, authentication information is configured such that authentication number values of a plurality of specific digit places of an authentication number and biometric data corresponding to the digit places are combined and input, and the authentication information may be configured such that the authentication order of the plurality of specific digit places is arbitrarily set.

In FIG. 12, assume that the user selects an authentication method of a "combination of a (2-digit) number and a fingerprint" and performs user authentication based on the authentication information including the combination of the 2-digit password and the fingerprints.

In addition, the 2-digit number may include a front-place number and a rear-place number, and authentication of the front-place number and the rear-place number may be randomly performed. Specifically, fingerprint recognition and number input of the front place may be first performed or fingerprint recognition and number input of the rear place may be first performed.

In FIG. 12, after authentication of the front place (or the rear place) succeeds, authentication of the rear place (or the front place) is performed. In addition, although it is assumed that fingerprint recognition is performed and then number input is performed, this may be variously modified according to embodiment. Number input may be first performed and then fingerprint recognition may be performed or fingerprint input may be first performed with respect to the front and rear places and then number input may be performed with respect to the two places after authentication of the fingerprint succeeds.

When the user selects an authentication method of a "combination of a (2-digit) number and a fingerprint" in an authentication window (not shown), an authentication window 1210, in which an input region of the number and the fingerprint to be authenticated is displayed, is displayed.

First, authentication of a front-place number is performed. When the input region 1211 for the front-place number is enlarged in the vertical direction to facilitate fingerprint input, the user inputs the fingerprint. When the fingerprint is authenticated, the input fingerprint 1221 is displayed and then a keypad for inputting the front-place number is displayed. The user may input a password value "1" 1231 corresponding to the front-place number on the keypad. When authentication succeeds, the input number "1" 1241 is displayed.

The input number "1" is displayed in the input region 1252 of the number and the fingerprint.

Figure 13:
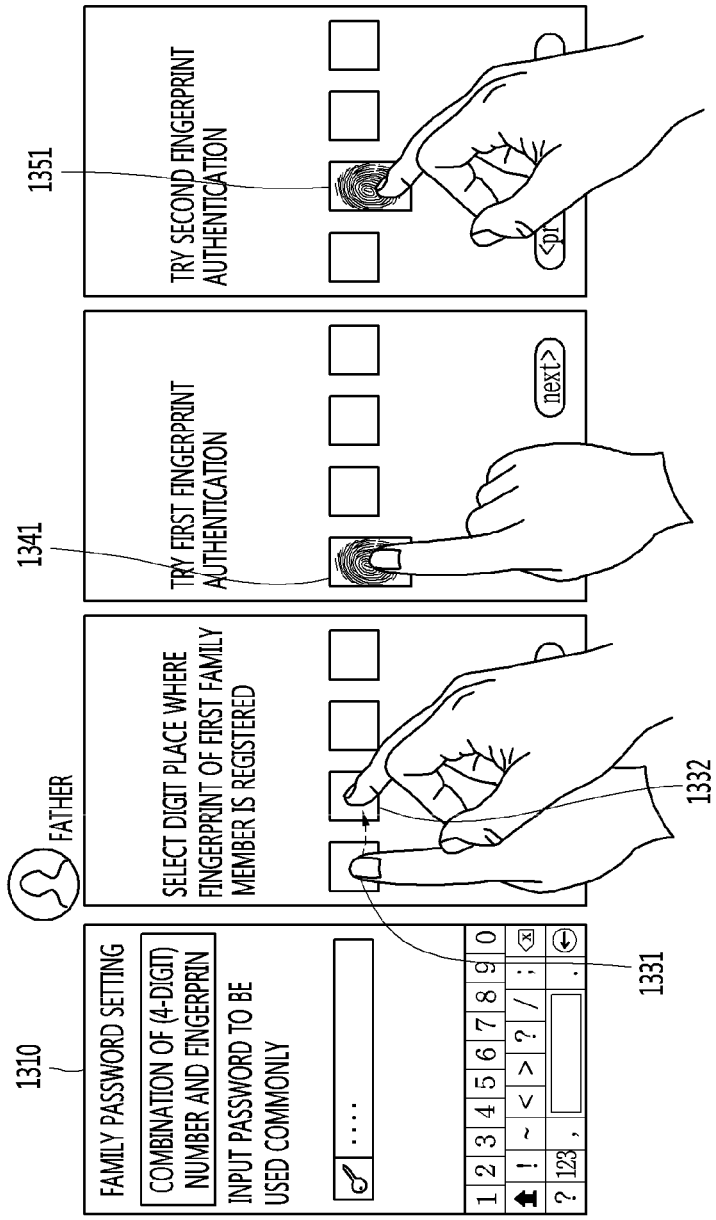
FIG. 13 is a schematic diagram illustrating a method of performing user authentication using biometric data according to an embodiment of the present invention.

FIG. 13 is a schematic diagram illustrating a method of performing user authentication using biometric data according to an embodiment of the present invention.

In FIG. 13, a process of setting the same authentication number with respect to a plurality of users belonging to a group described with reference to FIG. 7 will be described in detail with reference to the figure.

When an authentication window 1310 for setting a family password is displayed, a first family member, who first performs input, inputs a password which will be commonly used by family members.

Thereafter, the first family member selects a digit place where a number and a fingerprint will be both input from among the digit places of the password. Referring to FIG. 13, the user selected a first digit place 1331 and a second digit place 1332.

For fingerprint input, an input region 1331 corresponding to the first digit place is enlarged and displayed. In this case, the user registers fingerprints with respect to an enlarged input region 1341 corresponding to the first digit place and an enlarged input region 1351 corresponding to the second digit place. Specifically, the user inputs the fingerprint of an index finger in the input region 1341 corresponding to the first digit place and then inputs the fingerprint of a middle finger corresponding to the second digit place.

Although it is assumed that different fingerprints are registered with respect to the digit places in FIG. 13, the same fingerprint may be registered with respect to the digit places.

Thereafter, the fingerprints of a second family member and a third family member are registered using the same method, thereby completing the authentication number setting process.

Figure 14:
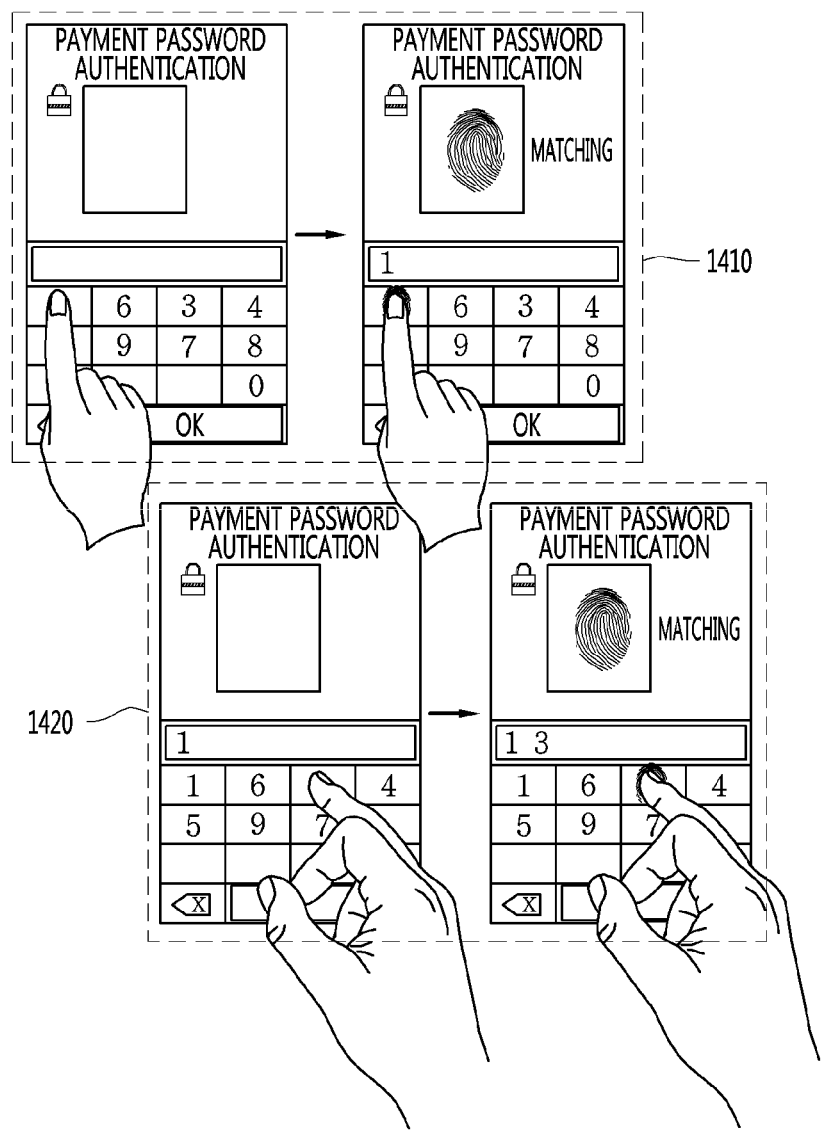
FIG. 14 is a schematic diagram illustrating a method of performing user authentication using biometric data according to an embodiment of the present invention.

FIG. 14 is a schematic diagram illustrating a method of performing user authentication using biometric data according to an embodiment of the present invention.

According to the embodiment shown in FIG. 14, the user may register different fingerprints with respect to digit places of the authentication number and perform user authentication based on the fingerprints.

In FIG. 14, assume that the user sets 1356 as a password, registers the fingerprint of the index finger with respect to the value "1" of the first digit place of the password, and registers the fingerprint of the middle finger with respect to the value "3" of the second digit place of the password.

An upper FIG. 1410 shows a process of inputting a number and a fingerprint with respect to the first digit place of the password. The user touches a numeral key "1" and then inputs the fingerprint of the index finger in the region of the numeral key 1. When the fingerprint is recognized, the input password value is displayed and the user is notified that authentication of the first digit place of the password is completed.

A lower FIG. 1420 shows a process of inputting a number and a fingerprint with respect to the second digit place of the password. The user touches a numeral key "3" and then inputs the fingerprint of the middle finger in the region of the numeral key 3. When the fingerprint is recognized, the input password value is displayed and the user is notified that authentication of the second digit place of the password is completed.

Thereafter, authentication of the third digit place and the fourth digit place is sequentially performed. Since fingerprints are registered with respect to the third digit place and the fourth digit place, fingerprint input is not necessary and authentication of each digit place is completed by only touching the numeral keys.

By registering different fingerprints with respect to the digit places of the password and combining several fingerprints having unique features to perform user authentication, it is possible to perform user authentication with higher security and reliability.

Figure 15:
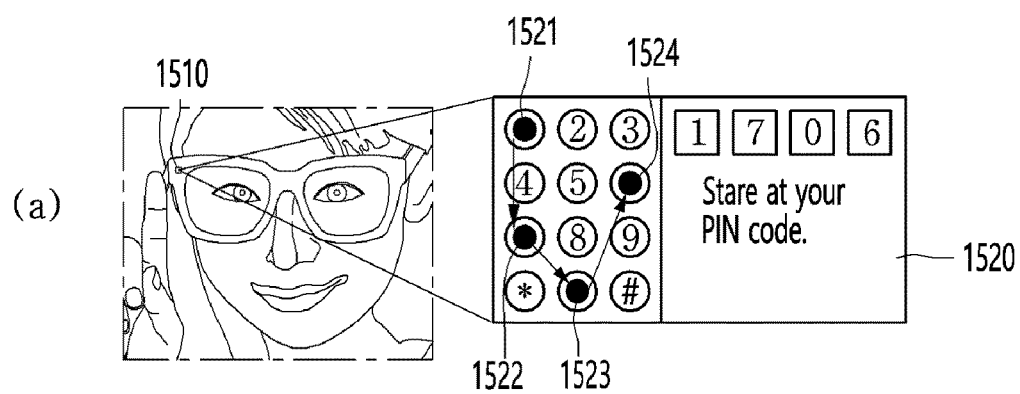
FIG. 15 is a schematic diagram illustrating a method of performing user authentication using biometric data according to an embodiment of the present invention.
Figure 15:
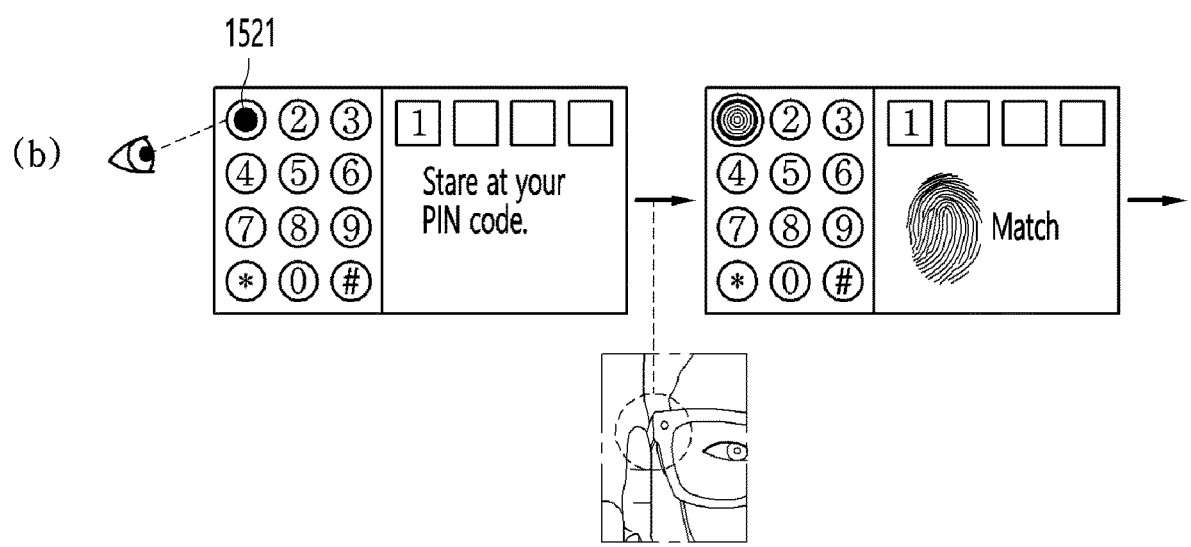

FIG. 15 is a schematic diagram illustrating a method of performing user authentication using biometric data according to an embodiment of the present invention.

In this case, the terminal device 200 for performing user authentication using biometric data according to the embodiment of the present invention may be a wearable device including glasses, a wristwatch and a band type device, which is used through wireless communication with a smartphone or a tablet.

In FIG. 15, assume that user authentication is performed based on authentication information including fingerprint information using smart glasses as a wearable device.

The smart glasses use a head mounted display method of mounting a display on a head or eyes of a user to acquire a sense of realism.

When the user wears the smart glasses and a projector mounted in the glasses transmits an LCD, CRT or OLED type image, the image reaches the user's eyes through a prism. To this end, the smart glasses may further include the projector and the prism.

An input device including a touch pad for user input may be mounted in a right temple of the smart glasses. The user may manipulate the smart glasses by touching the touch pad with a finger, rubbing the touch pad back and forth or swiping the touch pad. Fingerprint recognition may be performed through the touch pad.

(a) of FIG. 15 schematically shows a user authentication method according to the present embodiment.

The user starts to perform user authentication by manipulating the touch pad located on the right temple of the smart glasses 1510.

In this case, a virtual screen 1520 including a keypad and a password display window, in which an input password is displayed, is visible to the user's eyes.

When the user stares at the keypad part of the virtual screen for a predetermined time (e.g., 1 second, etc.), a number visible to the user's eyes is selected (1521, 1522, 1523 and 1524). In this case, the selected number is displayed in the password display window of the virtual screen 1520 and the user inputs the fingerprint in the keypad part corresponding to the number. The user may register the fingerprint information to be used for user authentication in advance.

By repeating such a process four times, the user selects the four-digit password and inputs fingerprints corresponding thereto. In FIG. 15, numbers "1" 1521, "7" 1522, "0" 1523 and "6 1524 are sequentially selected and the user performs fingerprint recognition with respect to each number.

(b) of FIG. 15 is a diagram illustrating user authentication according to the present invention.

The user stares at the keypad part of the virtual screen to select number "1" 1521. The user manipulates the touch pad located on the right temple of the glasses to input the fingerprint information in the numeral key "1" 1521. When the fingerprint is authenticated, a message indicating that the fingerprints are equal to each other is displayed on the virtual screen and 1 is displayed in the authentication number input window.

Authentication is sequentially performed with reference to the remaining numbers 7, 0 and 6.

Figure 16:
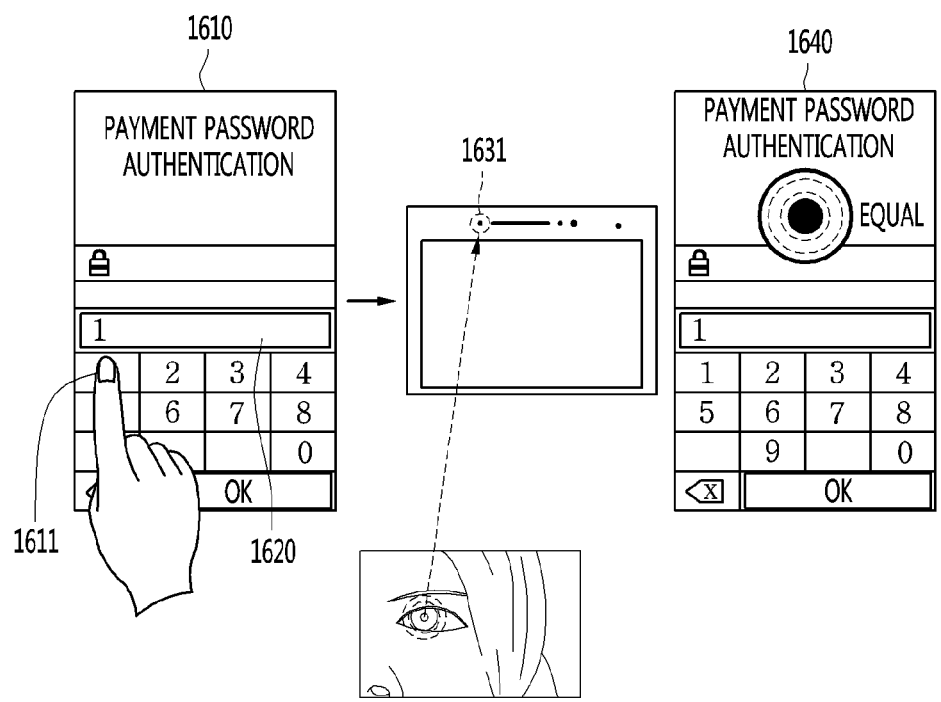
FIG. 16 is a schematic diagram illustrating a method of performing user authentication using biometric data according to an embodiment of the present invention.

FIG. 16 is a schematic diagram illustrating a method of performing user authentication using biometric data according to an embodiment of the present invention.

According to the present embodiment, iris recognition is used as biometric data. Iris recognition is performed by scanning and extracting a comb-shaped muscle pattern for controlling pupil dilation through the infrared camera. To this end, the terminal device for performing user authentication may further include the infrared camera.

The user needs to input authentication information including a combination of a password and iris information, for user authentication.

When an authentication window 1610 is displayed, the user touches a numeral key "1" 1611 corresponding to the first digit place of the password in the keypad part. When "1" is input and displayed in the password display window 1620, the user performs iris recognition.

The user stares at the camera 1631 of the terminal device 200 and the camera 1631 scans the muscle pattern of the iris to determine whether the scanned pattern is equal to the registered iris information.

When the scanned pattern is equal to the iris information, switching to an authentication window 1640 in which a payment password of 1 is displayed along with a message indicating that the scanned pattern is equal to the registered iris information is performed.

Thereafter, the user inputs the values of the remaining digit places of the password or inputs the password and the iris information, thereby completing user authentication.

Figure 17:
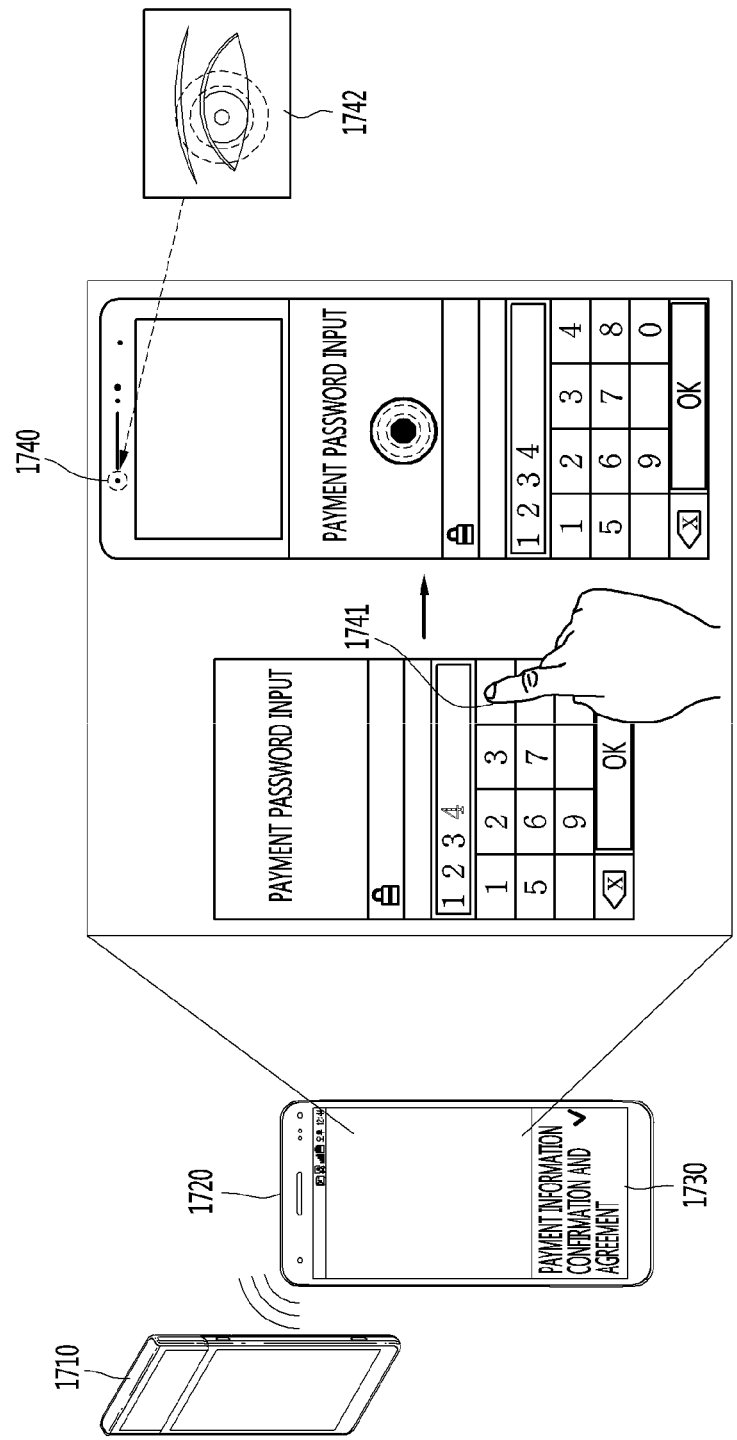
FIG. 17 is a schematic diagram illustrating a method of performing user authentication using biometric data according to an embodiment of the present invention.

FIG. 17 is a schematic diagram illustrating a method of performing user authentication using biometric data according to an embodiment of the present invention.

According to the present embodiment, the terminal device may communicate with an external device, receive user authentication information and perform user authentication. When authentication information cannot be input to the external device, the terminal device may perform user authentication according to the present embodiment.

To this end, the external device and the terminal device may transmit and receive user authentication information through near field communication (NFC) or wireless communication.

Referring to FIG. 17, when the user authentication information is received from the external device 1710, the terminal device 1720 displays an authentication window for performing user authentication.

The user selects payment information and confirmation and agreement 1730 in the authentication window and inputs a payment password. In FIG. 17, assume that the payment password is 1234 and iris information is set to be input upon inputting a last-place number "4".

The user sequentially inputs password values. After inputting the numeral key "4" 1741 corresponding to the last number 4, the user recognizes the camera 1740 located at an upper end to input the iris information 1742. When the scanned pattern is equal to the registered iris information, user authentication is completed.

Figure 18:
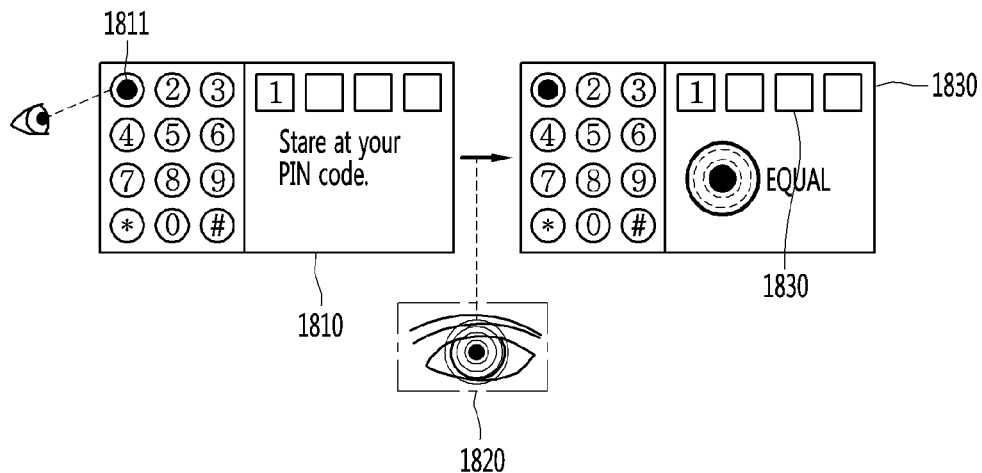
FIG. 18 is a schematic diagram illustrating a method of performing user authentication using biometric data according to an embodiment of the present invention.

FIG. 18 is a schematic diagram illustrating a method of performing user authentication using biometric data according to an embodiment of the present invention.

In the present embodiment, equally to the embodiment shown in FIG. 15, the terminal device 200 for performing user authentication is implemented by a wearable device. However, while fingerprint information is used as biometric data in FIG. 15, iris information is used instead of the fingerprint information in FIG. 18. To this end, the terminal device 200 may include an infrared camera.

In FIG. 18, assume that user authentication is performed based on authentication information including iris information using smart glasses as a wearable device.

Referring to FIG. 18, the user starts to perform user authentication by manipulating the touch pad located on the right temple of the smart glasses.

In this case, a virtual screen 1810 including a keypad and a password display window, in which an input password is displayed, is visible to the user's eyes.

When the user stares at the keypad part of the virtual screen for a predetermined time (e.g., 1 second, etc.), a number "1" 1811 visible to the user's eyes is selected. In this case, the selected number "1" is displayed in the password display window of the virtual screen 1810 and the user stares at a camera mounted in the glasses to input iris information 1820 corresponding to the number. The user may register the iris information to be used for user authentication in advance. When the input iris information is equal to the registered iris information, a message indicating that the input iris information is equal to the registered iris information is displayed on the virtual screen 1830.

By repeating the same process with respect to the numbers of the other digit places, the user completes user authentication.

Figure 19:
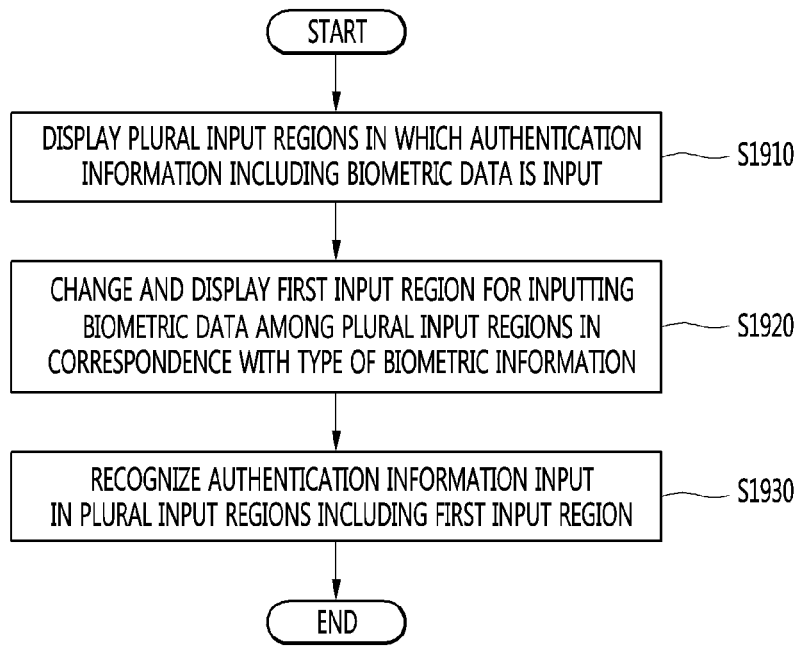
FIG. 19 is a schematic diagram illustrating a process of performing user authentication using biometric data according to an embodiment of the present invention.

FIG. 19 is a schematic diagram illustrating a process of performing user authentication using biometric data according to an embodiment of the present invention.

The terminal device 200 displays a plurality of input regions in which authentication information including biometric data is input (S1910).

The terminal device 200 changes and displays a first input region for inputting the biometric data among the plurality of input regions in correspondence to the type of the biometric data (S1920).

The terminal device 200 recognizes the authentication information input in the plurality of input regions including the first input region (S1930).

Although the preferred embodiments have been disclosed for illustrative purposes, the embodiments are only exemplified, but do not limit the present invention. Those skilled in the art will appreciate that various modifications and applications are possible, without departing from the embodiments. For example, the components described in the embodiments may be modified and embodied. Further, differences related to such modifications and applications should be interpreted as being included in the scope of the present invention defined by the accompanying claims.

What is claimed is:

1. A terminal for performing user authentication using biometric data, the terminal comprising:
a display configured to display any of a plurality of input regions in which authentication information including the biometric data is input; an authentication information recognizer overlapping the plurality of input regions and is configured to perform recognition of the authentication information; and a controller configured to: change a first input region from among the plurality of input regions based on a type of the biometric data to be input; cause the display to display the changed first input region; and control the authentication information recognizer to perform recognition of the authentication information input to the plurality of input regions including the changed first input region, wherein the authentication information further includes an authentication number, wherein the authentication information recognizer is further configured to recognize the authentication number and the biometric data together that is input in a same region of the plurality of input regions, wherein the authentication number is a combination of at least one of numbers, letters and special symbols input for authentication, and wherein the biometric data includes information on at least one of an iris, a blood vessel, a fingerprint, a face, or a voice, wherein the controller is further configured to perform the change in the first input region by enlarging vertically the first input region, when input of the biometric data is fingerprint recognition.

2. The terminal according to claim 1, wherein the controller is further configured to:
perform the change the first input region by enlarging horizontally the first input region, when input of the biometric data is iris recognition.

3. The terminal according to claim 1,
wherein the controller is further configured to:
set the authentication number with respect to a plurality of users belonging to a specific group.

4. The terminal according to claim 1,
wherein the controller is further configured to:
combine an authentication number value of a specific digit place of the authentication number and the biometric data corresponding to the specific digit place.

5. The terminal according to claim 1,
wherein the controller is further configured to:
combine authentication number values of each of a plurality of specific digit places of the authentication number and the biometric data corresponding to each of the plurality of specific digit places.

6. The terminal according to claim 5, wherein the controller is further configured to:
randomly set authentication order of each of the plurality of specific digit places.

7. A method for performing user authentication using biometric data at a terminal having a display, the method comprising:
displaying, on the display, a plurality of input regions in which authentication information including the biometric data is input; changing a first input region from among the plurality of input regions based on a type of the biometric data to be input; displaying, on the display, the changed first input region; and
performing recognition of the authentication information input to the plurality of input regions including the changed first input region, wherein the authentication information further includes an authentication number, wherein performing recognition of the authentication information further comprises: recognizing the authentication number and the biometric data together that is input in a same region of the plurality of input regions, wherein the authentication number is a combination of at least one of numbers, letters and special symbols input for authentication, and wherein the biometric data includes information on at least one of an iris, a blood vessel, a fingerprint, a face, or a voice, wherein a controller is further configured to perform the change in the first input region by enlarging vertically the first input region when input of the biometric data is fingerprint recognition.

8. The method according to claim 7, further comprising:
performing the change the first input region by enlarging horizontally the first input region, when input of the biometric data is iris recognition.

9. The method according to claim 7, wherein the method further comprises:
setting the authentication number with respect to a plurality of users belonging to a specific group.

10. The method according to claim 7, wherein the method further comprises:
combining an authentication number value of a specific digit place of the authentication number and the biometric data corresponding to the specific digit place.

11. The method according to claim 7,
wherein the method further comprises:
combining authentication number values of each of a plurality of specific digit places of the authentication number and the biometric data corresponding to each of the plurality of specific digit places.

12. The method according to claim 11, and wherein the method further comprises:
randomly setting authentication order of each of the plurality of specific digit places.

* * * * *